Patented Jan. 7, 1947

2,414,049

UNITED STATES PATENT OFFICE 2,414,049

PURIFICATION OF TITANIUM SALT SOLUTIONS

George L. Lewis, Christiana, Del., assignor to E. I. du Pont de Nemours & Company, Wilmington, Del., a corporation of Delaware No Drawing. Application November 28, 1944, Serial No. 565,567

5 Claims. (Cl. 23—117)

This invention relates to the separation of difficultly-removable matter from solutions, and more particularly to the removal of sulfide precipitates from concentrated solutions employed in the manufacture of titanium oxide pigments.

As is well-known, titanium pigments are produced from ilmenite by a sulfuric acid dissolution process involving the sulfation of the titaniferous ore to obtain the desired titanium sulfate solution, the removal of slimes from such solution by a clarification treatment, the separation of copperas from the clarified solution, followed by a further clarification treatment, and the subsequent hydrolysis of the purified solution thus obtained, followed by calcination of the recovered hydrolysate to develop essential pigment properties.

The titaniferous ores used in such pigment production operation are composed largely of iron oxide and titanium oxide probably in the form of an iron titanate. In addition, other elements are present, including silicon, chromium, vanadium, magnesium, aluminum, phosphorus, etc. Some of these go into complete solution during the dissolving operation and remain in the acid solution recovered from the titanium oxide precipitate resulting from hydrolysis. Other less soluble impurites remain in the original solution to form the muds and slimes which during clarification must be separated by chemical or physical treatment. The concentration of the soluble matter in the solution depends in some measure on the composition of the ore, but usually the dissolving operation is conducted in such manner that the gravity of the solution will be around 52° Baumé. Higher concentrations engender difficult clarifications, while lower concentrations promote more costly, uneconomical operations because greater liquor volumes must be handled and an evaporation step may be required to produce a pigment of satisfactory quality.

The insoluble matter which remains suspended in the solution cannot be readily separated therefrom by simple filtration for the reason that it is in colloidally-dispersed state. These colloidal slimes may be removed, however, highly useful processes for that purpose comprising those disclosed in U. S. Patent 1,633,621 which contemplates treating to solution with a heavy metal to form a sulfide carrying an opposite electric charge to that carried by the suspended matter. As a result, coagulation of such suspended matter takes place, after which the coagulated material settles out for separation and removal from the main body of the solution upon dilution and washing. This diluted liquor may be returned to assist in the dissolving operations or otherwise reused in the process.

The solution recovered from the clarification (which contains iron in the original ore as well as any iron required to reduce the ferric iron originally present in the ore) is then chilled, in accordance with known procedures, as a result of which ferrous sulfate or copperas crystals appear. The amount of ferrous sulfate formed depends on the final temperature, and with a temperature not greater than about 20° C., the solution under treatment usually contains not more than about 40 parts of iron per 100 parts of $TiO_2$ by weight. The copperas formed during the chilling is caused to be removed from the mother liquor by filtering, centrifuging, etc., after which the titanium liquor is ready for a second or final clarification prior to its subjection to hydrolysis. Final clarification is necessary in order to insure high hydrolysate yields and maximum brightness properties in the final pigment.

The clarification reagents used in purifying titanium solutions comprise, as contemplated in said Patent 1,633,621, certain heavy metal sulfides, especially those of antimony, copper, arsenic and tin. The sulfide is formed in the solution being treated by incorporating therein an oxygen compound of the metal the insoluble sulfide of which is desired, and causing such compound to react with a metallic sulfur compound which will liberate hydrogen sulfide within the solution and precipitate therein the particular insoluble sulfide.

It has been found that in practice some of the heavy metal employed as the clarification precipitant remains in solution after copperas removal. Its presence, even in very minute quantities, is objectionable because it, together with any color-imparting impurities introduced into the solution from the ore, exerts a deleterious effect upon the subsequent hydrolysis operations (induces a poor yield) as well as upon the final pigment (impairs its color). Therefore, it must not be allowed to remain and must be removed prior to such hydrolysis. The heavy metal may be precipitated through use of further $H_2S$ additions but this alone has proved ineffective and impractical for effecting the complete and effective removal desired. Filtering to effect removal is unsatisfactory because the material is so fine that filter cloths become "blinded" or clogged in the process, causing a rapid falling off in the filter rate even though resort is had to diatomaceous earth filter as an aid in this operation.

It is among the objects of this invention to overcome the above and other difficulties encountered in prior TiO2 pigment-producing operations, and especially those existing in the clarification and purifying stages of said operations. Particular objects include the preparation of more highly purified titanium salt solutions; an improvement in the filtration rate of solutions containing minor amounts of sulfide precipitates, especially those of antimony; and the removal of small amounts of heavy metals from acid solutions by precipitation of sulfides through means of a liquid reagent adapted to improve the filtration operation when removing said sulfide from the aqueous medium. Other and further objects of the invention will be apparent from the ensuing description thereof.

These and other objects are obtained in this invention by carrying out the filtration and clarification of titanium solutions, especially titanium sulfate, in which heavy metal sulfide precipitates are suspended in the presence of a minor amount of a sulfonated oil.

The invention will be described as applied to its preferred adaptation, i. e., in the clarification of a titanium sulfate solution prepared from ilmenite and its clarification with the aid of antimony and a soluble sulfide in the coagulation of the colloidal muds. The antimony sulfide coagulates the larger portion of the mud and this is removed by settling operations, after which the clarified solution is sent on for the copperas removal operation. The solution, subsequent to the copperas removal, however, has invariably been found to contain small but objectionable amounts (.005% to .1%) of antimony. In accordance with this invention, a small amount of a sulfonated oil, such as Turkey red oil, sulfonated olive oil, sulfonated petroleum oil, etc., is incorporated in the solution after its treatment with an excess of hydrogen sulfide, the latter being conveniently carried out by the adding thereto of powdered ferrous sulfide or a small quantity of a sulfide in an aqueous solution. This causes the formation of antimony sulfide, difficult to completely remove by filtration methods. Following the sulfonated oil addition, the treated liquor is passed over or through a suitable filter in which complete and effective removal of the antimony sulfide is accomplished. The use of a filter aid, such as diatomaceous earth at this point is optional, but is advantageous since it promotes better handling of the materials.

To a clearer understanding of the invention the following examples are given. These are merely illustrative and demonstrate its utility. It is to be understood, however, that the invention is not limited thereto.

*Example I*

A titanium sulfate solution at 45° C. containing 160 grams of TiO2 per liter, 83 grams of iron and 485 grams of total sulfuric acid (free and combined acid) along with a small amount of trivalent titanium and .07 gram of antimonyl sulfate per liter was divided into three portions as follows: (a) a first portion, used as a control and to which nothing was added; (b) a second portion to which 0.1 gram of FeS per liter were added while the solution was maintained at 45° C.; and (c) a third portion which was treated while maintained at a temperature of 45° C., with an equal amount of FeS and in addition 0.5 cc. of commercial Turkey red oil, after the iron sulfide had been given time to dissolve in the 45° C. liquor. Each of these solutions (a), (b) and (c) was adjusted to the same temperature, namely, 45° C., after which the liquids were filtered through a cloth coated with a small amount of diatomaceous earth using a vacuum filter (vacuum equal to 27″ of mercury). The original untreated liquor was slightly cloudy and filtered well, as shown by the results for portion 1. Portion 2 which contained precipited antimony sulfide filtered very slowly, while portion 3, treated with Turkey red oil and also containing precipitated antimony sulfide, filtered even more rapidly than portion 1. The filtration times for each of the 3 portions were 2½ minutes, 16 minutes, and 2¼ minutes, respectively.

*Example II*

This example will show the preferred method of clarifying commercial titanium sulfate liquors employed in a TiO2 pigment producing operation. Each step of the operation from the precipitation of the solution to the final clarification operations will be discussed.

A 52° Baumé titanium sulfate solution was prepared from sulfated ilmenite mass to which had been added 5 lbs. of Sb2O3 per ton of TiO2 to be found in the resulting solution. The ferric iron of this solution was eliminated by treatment with an amount of scrap iron sufficient to provide 3 grams of Ti2O3 per liter. This solution was pumped to a clarification apparatus similar to that described in U. S. 2,111,788 where it was treated with sodium sulfide solution using 30% more sodium sulfide than Sb2O3 (1.3 equivalents of Na2S per equivalent of Sb2O3). The relatively clear overflow from this clarification step was then cooled to remove copperas in the usual manner and with the aid of a centrifuge to separate the crystals from the liquor. This titanium liquor was found to contain 200 parts of Sb2O3 per million parts of TiO2 and had a slight turbidity. This solution was again treated with a slight excess of a soluble sulfide to precipitate the antimony as the sulfide. Subsequently, one gallon of commercial Turkey red oil was added for each 14,000 gallons of the titanium liquor. The resulting solution was then pumped to a filter which had been pre-coated with diatomaceous earth. The filtration rate was found quite rapid and the filtrate was substantially free of antimony as well as suspended matter. The output of the filter was found to be increased about five fold when using the sulfonated oil as compared to filtration in the absence of this agent.

While the invention has been described as applied to an antimony sulfide clarification in removing slimes from a titanium sulfate solution, it is also applicable to and effective in the other heavy metal sulfide clarifications, as well as to purifying other titanium salt solutions, such as the chloride, nitrate, acetate, etc. Included among such sulfides are those of arsenic, copper and tin, in addition to antimony. The amount of antimony or other heavy metal clarification chemicals used is variable over wide limits, but amounts in excess of about 5 or 10 lbs. per ton of TiO2 in the solution is not recommended because of the cost of the chemical reagent. Four to five lbs. of Sb2O3 per ton TiO2 is usually provided in the original dissolving liquor and no further addition is made after the copperas removal step. The solution at this point will usually contain about 200 parts of Sb2O3 per million parts of TiO2 although the amount may vary from 50 to 1000 parts of Sb2O3 or other useful oxide per million parts of TiO$_2$ and such amounts are quite readily removed by this invention.

The amount of colloidal material present in titanium sulfate solutions depends in large measure on the amount of insoluble material present in the ore from which it is prepared. In most instances the amount is considerable and may run 5 or more grams per liter. It also appears that ores containing large percentages of TiO$_2$ contain large percentages of insoluble slimes and when using such ores it is usually best to settle by sedimentation in the first clarification step rather than by removing these insoluble materials by filtration methods. It is for this reason that I do not prefer to make use of my invention in the first clarification treatment of titanium sulfate solutions but it is understood that the invention would have utility if filtration operations were employed.

Turkey red oil comprises a preferred treating agent for use in the invention, due to its commercial availability and effectiveness. This reagent is obtained from the sulfonation of castor oil and is widely used in the textile industry. As already indicated, other sulfonated oils can also be used or substituted, including sulfonated petroleum, sulfonated olive oil, sulfonated cotton seed oil, and other sulfonated mineral or vegetable oils. The quantity of oil used is relatively small or minor, an amount of about 1 gallon of oil per each 10,000–20,000 gallons of the liquor being usually sufficient for all practical or desired effects. Larger amounts may be used, if desired, but are unnecessary as well as uneconomical. Such an addition of an organic reagent exerts no effect upon the quality of the final pigment, nor is its presence in the solution detectable subsequent to the clarification filtration. Its presence appears to change the nature of the finely-divided precipitate and aids or promotes its removal. As a consequence, an advantageous improvement in the filtration rate directly results.

I claim as my invention:

1. A process for treating a titanium salt solution employed in titanium oxide pigment manufacture to remove a metal sulfide reagent introduced therein to promote its clarification, which comprises incorporating in said solution about 1 gallon of a sulfonated oil per each 10,000 to 20,000 gallons of solution, and then filtering the resulting mixture.

2. A process for treating a hydrolyzable titanium salt solution employed in titanium oxide pigment manufacture to remove any heavy metal sulfide reagent introduced into said solution to promote its clarification, which comprises prior to hydrolysis adding to said solution about 1 gallon of a sulfonated oil per each 10,000 to 20,000 gallons of solution and then subjecting the treated solution to filtration.

3. A process for treating a hydrolyzable titanium sulfate solution employed in titanium oxide pigment manufacture containing a small amount of a heavy metal sulfide reagent introduced into said solution to promote clarification thereof, which comprises incorporating in said solution about 1 gallon of a sulfonated oil per each 10,000 to 20,000 galons of solution, and then filtering the resulting mixture.

4. A process for treating a hydrolyzable titanium sulfate solution employed in titanium oxide pigment manufacture to remove any antimony sulfide reagent introduced into said solution to promote its clarification which comprises prior to hydrolysis adding to said solution about 1 gallon of sulfonated oil per each 10,000 to 20,000 gallons of liquor, and then filtering the resulting mixture.

5. A process for treating a hydrolyzable titanium sulfate solution employed in titanium oxide pigment manufacture to remove prior to hydrolysis any antimony sulfide reagent introduced into said solution to promote its clarification which comprises adding to said solution about 1 gallon of Turkey red oil per each 10,000 to 20,000 gallons of liquor, and then filtering the resulting mixture.

GEORGE L. LEWIS.